US007769749B2

(12) United States Patent
He

(10) Patent No.: US 7,769,749 B2
(45) Date of Patent: Aug. 3, 2010

(54) WEB PAGE CATEGORIZATION USING GRAPH-BASED TERM SELECTION

(75) Inventor: Xiaofei He, Burbank, CA (US)

(73) Assignee: Yahoo! Inc., Sunnyvale, CA (US)

( * ) Notice: Subject to any disclaimer, the term of this patent is extended or adjusted under 35 U.S.C. 154(b) by 306 days.

(21) Appl. No.: 11/938,983

(22) Filed: Nov. 13, 2007

(65) Prior Publication Data

US 2009/0125503 A1  May 14, 2009

(51) Int. Cl.
*G06F 17/30* (2006.01)
(52) U.S. Cl. ...................................................... 707/722
(58) Field of Classification Search ...................... 707/5, 707/722; 700/47; 705/14.52
See application file for complete search history.

(56) References Cited

U.S. PATENT DOCUMENTS

| 6,591,248 | B1 * | 7/2003 | Nakamura et al. | ........ 705/14.52 |
| 2003/0236578 | A1 * | 12/2003 | Gammerman et al. | ......... 700/47 |
| 2008/0275862 | A1 * | 11/2008 | Liu et al. | ........................ 707/5 |

* cited by examiner

*Primary Examiner*—Etienne P LeRoux
(74) *Attorney, Agent, or Firm*—James J. DeCarlo; Greenberg Traurig, LLP

(57) ABSTRACT

This disclosure describes systems and methods for categorizing web pages. Web pages and terms selected from those web pages are organized in a matrix. The number of terms in the matrix are filtered using a Laplacian score algorithm. A linear regression algorithm or some other algorithm may use the filtered set of terms to fit the web pages into pre-defined categories.

25 Claims, 3 Drawing Sheets

WEB PAGE CATEGORIZATION USING GRAPH-BASED TERM SELECTION

BACKGROUND

A 2005 Gulli & Signorini study showed that the number of web pages that can be indexed is nearing 12 billion. In light of the large number of web pages, web page indexing is used by many we-based applications such as web search engines and web-based advertising applications. Indexing is also generally performed by web spiders and is used by search engines such as GOOGLE and YAHOO! SEARCH. A web spider, or web crawler, is a program or automated script that methodically scans the World Wide Web and collects copies of web pages to be indexed by a search engine.

SUMMARY

This disclosure describes systems and methods for categorizing web pages. One aspect of the disclosure is a method that comprises retrieving a plurality of web pages, selecting a plurality of terms from each web page, assigning a Laplacian score to each term, filtering each plurality of terms by each terms' Laplacian score to form filtered sets of terms, and categorizing each web page of said plurality based on the filtered sets of terms.

The disclosure also describes a method that comprises defining a term-document matrix X, wherein the elements of X represent the importance of terms that appear in a plurality of web pages to the web pages that each term appears in. The method also comprises calculating a Laplacian score for each term and assigning each score to the term that the Laplacian score was calculated for, and selecting a set of filtered terms based on the Laplacian scores.

The disclosure also describes a method comprising retrieving a plurality of web pages, selecting a plurality of terms from each web page, defining a term-document matrix X, wherein the elements of matrix X are defined as $X_{ij}$, wherein i comprises the values 1 to n, wherein j comprises the values 1 to m, wherein n is the number of terms, wherein m is the number of web pages, wherein $X_{ij}$ represents the appearance of an $i^{th}$ term in a $j^{th}$ web page, defining an m by m similarity matrix S, wherein the elements of matrix S are defined as $S_{xy}$, wherein x comprises the values 1 through m, wherein y comprises the values 1 through m, wherein $S_{xy}$ is a first number if the $x^{th}$ and $y^{th}$ web pages are hyperlinked, wherein $S_{xy}$ is a second number if the $x^{th}$ and $y^{th}$ web pages are not hyperlinked, defining an m by m diagonal matrix D, wherein the diagonal matrix elements are defined as $D_{zz}$, wherein z comprises the values 1 through m, wherein $D_{zz}$ is the sum of elements $S_{1y}$ through $S_{my}$, wherein y=z, defining an m by m Laplacian matrix L as the difference between the diagonal matrix D and the similarity matrix S, defining a term vector $f_x$, wherein $f_x$ is a 1 by m vector comprising the matrix elements $X_{i1}$ through $X_{im}$, wherein the subscript x comprises the values 1 through n, defining a new term vector $f_x'$, wherein $f_x$ is the term vector, wherein D is the diagonal matrix, wherein 1 is a horizontal vector whose elements all have the value 1, wherein 1 has dimensions equivalent to those of $f_x$, wherein the superscript T indicates a transpose of the horizontal vector 1, wherein the subscript x comprises the values 1 through n, defining a Laplacian score $L_x$, wherein $f_x'$ is the new term vector, wherein the superscript T indicates a transpose of the new term vector $f_x'$, wherein D is the diagonal matrix, assigning the Laplacian score $L_x$ to the term associated with $f_x$, wherein the subscript x comprises the values 1 through n, ordering the terms based on each term's assigned Laplacian score $L_x$, removing consecutively ordered terms from the plurality of terms to form a filtered set of terms, and fitting each web page to a category.

The disclosure also describes a system comprising a filtering system including a keyword filter that retrieves a plurality of web pages, selects a plurality of terms from each web page, assigns a Laplacian score to each term, filters each plurality of terms by each terms' Laplacian score to form filtered sets of terms. The system also comprises an analysis system that applies a ridge regression algorithm to the filtered set of terms, and fits each web page to a category.

The disclosure also describes a computer readable medium comprising computer code for retrieving a plurality of web pages, selecting a plurality of terms from each web page, defining a term-document matrix X, wherein the elements of matrix X are defined as $X_{ij}$, wherein i comprises the values 1 to n, wherein j comprises the values 1 to m, wherein n is the number of terms, wherein m is the number of web pages, wherein $X_{ij}$ represents the appearance of an $i^{th}$ term in a $j^{th}$ web page, defining an m by m similarity matrix S, wherein the elements of matrix S are defined as $S_{xy}$, wherein x comprises the values 1 through m, wherein y comprises the values 1 through m, wherein $S_{xy}$ is a first number if the $x^{th}$ and $y^{th}$ web pages are hyperlinked, wherein $S_{xy}$ is a second number if the $x^{th}$ and $y^{th}$ web pages are not hyperlinked, defining an m by m diagonal matrix D, wherein the diagonal matrix elements are defined as $D_{zz}$, wherein z comprises the values 1 through m, wherein $D_{zz}$ is the sum of elements $S_{1y}$ through $S_{my}$, wherein y=z, defining an m by m Laplacian matrix L as the difference between the diagonal matrix D and the similarity matrix S, defining a term vector $f_x$, wherein $f_x$ is a 1 by m vector comprising the matrix elements $X_{i1}$ through $X_{im}$, wherein the subscript x comprises the values 1 through n, defining a new term vector $f_x'$, wherein $f_x$ is the term vector, wherein D is the diagonal matrix, wherein 1 is a horizontal vector whose elements all have the value 1, wherein 1 has dimensions equivalent to those of $f_x$, wherein the superscript T indicates a transpose of the horizontal vector 1, wherein the subscript x comprises the values 1 through n, defining a Laplacian score $L_x$, wherein $f_x'$ is the new term vector, wherein the superscript T indicates a transpose of the new term vector $f_x'$, wherein D is the diagonal matrix, wherein L is the Laplacian matrix, assigning the Laplacian score $L_x$ to the term associated with $f_x$, wherein the subscript x comprises the values 1 through n, ordering the terms based on each term's assigned Laplacian score $L_x$, removing consecutively ordered terms from the plurality of terms to form a filtered set of terms, and fitting each web page to a category.

These and various other features as well as advantages will be apparent from a reading of the following detailed description and a review of the associated drawings. Additional features are set forth in the description which follows, and in part will be apparent from the description, or may be learned by practice of the described embodiments. The benefits and features will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The following drawing figures, which form a part of this application, are illustrative of embodiments of systems and methods described below and are not meant to limit the scope

DETAILED DESCRIPTION

Figure 1:
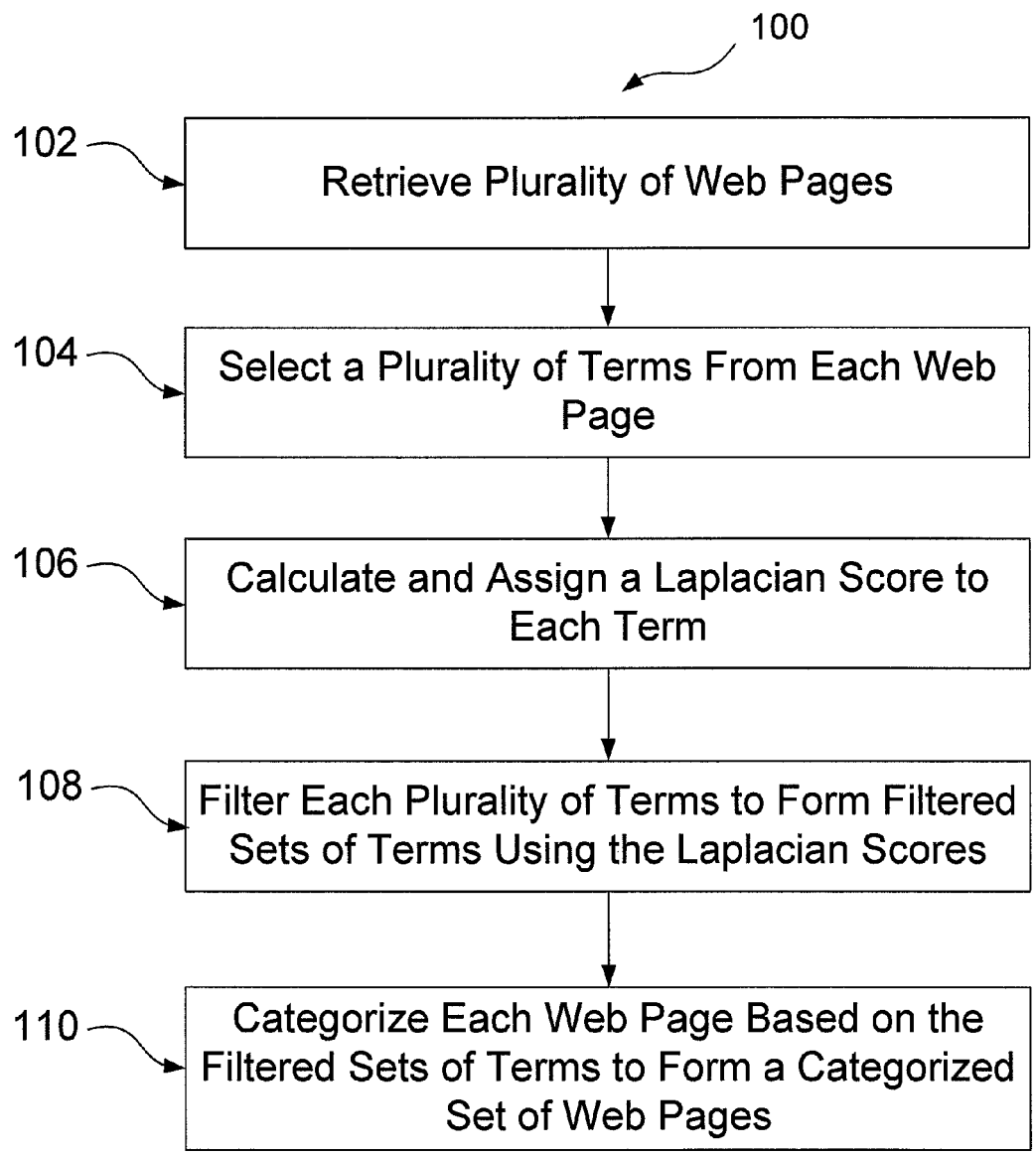
FIG. 1 illustrates a method for categorizing web pages.

For the purposes of this disclosure a computing device includes a processor and memory for storing and executing program code, data and software. Computing devices may be provided with operating systems that allow the execution of software applications in order to manipulate data. Servers, personal computers, PDAs, wireless devices, cell phones, internet appliances, media players, home theater systems, and media centers are several non-limiting examples of computing devices.

For the purposes of this disclosure, a web page comprises a document that may be retrieved from a computing device. Other commonly-understood terms used to describe a web page include a document, web document, or internet document. A web page may be an HTML document or a non-HTML document such as a portable document (pdf). Web pages may be accessed from a computing device such as a server and may be accessed via a network. A web page may be viewed over the World Wide Web via a web browser. Web pages may be identified via a Uniform Resource Locator (URL) or a Universal Resource Identification (URI). Aggregations of web pages sharing a common domain are collectively referred to as a web site.

For the purposes of this disclosure an advertisement server is software, hardware, or firmware (or combinations thereof) capable of searching a database or other repository of ads to find one or more ads to serve on web pages and storing data. An advertisement server may be a single server or a group of servers acting together. An advertisement server selects ads to serve based on algorithms meant to match ads with web pages in which those ads will generate the most money for the entity employing the aforementioned algorithms. This can be an advertiser, an advertisement serving company (e.g. YAHOO!, GOOGLE), an advertisement exchange, or an advertisement network. At the same time advertisement servers must select ads that meet guidelines set by the web site and agreed to by the advertiser. The search engine, advertisement engine, advertisement control system and advertisement server may or may not be embodied as one system or as multiple parts of a distributed system, or as sub-systems of one or the other engines or systems described herein. A number of program modules and data files may be stored on a computer readable medium of the server. They may include an operating system suitable for controlling the operation of a networked server computer, such as the WINDOWS XP or WINDOWS 2003 operating systems from MICROSOFT CORPORATION.

For the purposes of this disclosure a computer readable medium stores computer data in machine readable form. By way of example, and not limitation, a computer readable medium may comprise computer storage media and communication media. Computer storage media includes, but is not limited to, volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by a computing device.

For the purposes of this disclosure an engine is a software, hardware, or firmware (or combinations thereof) system, process or functionality that performs or facilitates the processes, features, and/or functions described herein (with or without human interaction or augmentation). A search engine in particular may accept search criteria, such as search terms and dates of publication, query a network for web pages meeting the search criteria, and return query results. Additionally, an advertisement engine in particular requests ads from an advertisement server, and may also route ads from the advertisement server to other systems.

Systems and methods are herein disclosed for categorizing web pages. In order to categorize a plurality of web pages, a term-document matrix X may be formed where the elements of the matrix may represent the appearance of terms in different web pages. Such a term-document matrix X may be defined as follows:

$$X = \begin{pmatrix} X_{11} & X_{12} & \ldots & X_{1m} \\ X_{21} & X_{22} & \ldots & X_{2m} \\ \vdots & \vdots & \ddots & \vdots \\ X_{n1} & X_{n2} & \ldots & X_{nm} \end{pmatrix} \quad (1)$$

Each matrix element may be defined as $X_{ij}$ where the subscript i may comprises the values 1 to n, and the subscript j may comprises the values 1 to m. In an embodiment, n may represent the number of web pages and m may represent the number of terms. In another embodiment, n may represent the number of terms and m may represent the number of web pages. The matrix elements $X_{ij}$ may represent the appearance of an $i^{th}$ term in a $j^{th}$ web page. For the purposes of this disclosure a term may include characters, numbers, symbols, words, names, multiple words, phrases, or full sentences.

An example of a term-document matrix can be demonstrated by assuming that three web pages A, B, and C, are to be categorized. The terms Ace, Bat, and Car appear at least once in web page A. The terms Ace, Car, and Door appear at least once in web page B. The terms Car, Door, and Ear appear at least once in web page C. The chart below shows a binary representation of term appearances in the web pages A, B, and C.

|      | A | B | C |
|------|---|---|---|
| Ace  | 1 | 1 | 0 |
| Bat  | 1 | 0 | 0 |
| Car  | 1 | 1 | 1 |
| Door | 0 | 1 | 1 |
| Ear  | 0 | 0 | 1 |

The corresponding term-document matrix X would appear as follows:

$$X = \begin{pmatrix} 1 & 1 & 0 \\ 1 & 0 & 0 \\ 1 & 1 & 1 \\ 0 & 1 & 1 \\ 0 & 0 & 1 \end{pmatrix} \quad (2)$$

The terms in web page A are represented by the vector (1 1 1 0 0), the terms in B by (1 0 1 1 0), and the terms in C by (0 0 1 1 1).

Linear regression, or other means for comparing vectors, may be used to fit the web pages into pre-defined categories. Using these example vectors to match the web pages A, B, and C with pre-defined categories may be simple. However, real applications involve thousands of web pages and sometimes million of terms. As such, the process of fitting web pages into categories is computationally-intensive and prone to inaccuracy.

The disclosed methods filter or reduce the number of terms in the matrix so that the linear regression, or some other means of fitting web pages into categories, may be performed with greater speed and accuracy.

FIG. 1 illustrates a method for categorizing web pages. This method 100 may be performed by a computing device taking instruction from a web host, search engine, internet service provider, or any other computing device that is instructed to categorize web pages. In an embodiment, the method 100 may operate continuously. In one embodiment, the method 100 operates in a series of overlapping loops. For instance, the method 100 may categorize news web pages while at the same time also categorizing entertainment web pages. In another embodiment, the method 100 may operate in discrete and periodic time segments. For instance, the method 100 may initiate and run on the hour, once every twenty four hours, or at any other periodic time. On the other hand, the method 100 may run in discrete non-periodic time segments. For instance, the method 100 may run more often during times when the method 100 sees high rates of usage. Alternatively, the method 100 may vary the period with which it runs based on the number of new web pages that appear on the web, based on the rate with which web pages on the web are modified, or based on a combination of the two. Other algorithms for determining when the method 100 may run may also be used.

The method 100 may begin by retrieving one or more web pages in a retrieve plurality of web pages operation 102. Web pages may be retrieved from the Internet, an intranet, a network, or a combination thereof. For a given web page, retrieving may comprise accessing the web page, copying the web page, and storing the copy for later use. Alternatively, the copy may be immediately provided for use in subsequent operations of the method 100. In one embodiment, retrieving a web page may include determining an address associated with the web page and providing this address for use in subsequent operations of the method 100. For instance, hyperlinks may be provided by the retrieve operation 102 so that subsequent operations may use these hyperlinks to access the retrieved web pages.

From the retrieved plurality of web pages a plurality of terms may be selected from each web page in a select plurality of terms from each web page operation 104. In an embodiment, all terms on a web page may be selected in the selection operation 104. Alternatively, all terms on a web page may be selected, and common terms such as "the," "as," "if" "and," etc. may be removed from the selected terms. In another embodiment, all terms may be selected from a web page, the frequency of each term's appearance in the web page may be determined, and a percentage of selected terms may be retained based on their frequency of appearance. Other means for selecting the most useful terms from a web page may also be implemented.

A Laplacian score may then be calculated for each term and assigned to each term in a calculate and assign Laplacian score for each term operation 106. This, operation is described in detail later and with reference to FIG. 2.

Once a Laplacian score is assigned to at least two terms, terms may be filtered based on these scores in a filter each plurality of terms operation 108. This filtering operation 108 orders the terms based on the Laplacian scores assigned to each term. Terms with higher Laplacian scores may be filtered. In an embodiment, filtering may include removing terms from the plurality of terms. For instance, and again using the imaginary web pages A, B, and C, assume that the selection operation 104 selected the following five terms from these web pages: Ace, Bat, Car, Door, and Ear. The calculation operation 106 may then have assigned the five terms Laplacian scores as follows: Ace (2), Bat (4), Car (4), Door (1), and Ear (0). These terms may be ordered in terms of their Laplacian scores as follows: Ear (0), Door (1), Ace (2), Bat (4), and Car (4). Since Ear received the lowest score it is likely the most relevant term for categorizing the web pages in which it appears. Car is likely the least relevant term since it has the highest Laplacian score. As such, the five terms may be filtered so that a filtered set of terms remains. In this example, if the filtered set was only to comprise two terms, then based on Laplacian scores, Ace, Bat, and Car would be filtered out leaving Ear and Door in the filtered set of terms. In one embodiment, a threshold Laplacian score may be selected, and all terms with Laplacian scores higher than this number may be filtered out. Looking to the example terms again, assume a threshold Laplacian score of 3. Such a threshold would lead to Bat (4) and Car (4) being filtered out, and Ear (0), Door (1), and Ace (2) would comprise the filtered set of terms. In another embodiment, filtering may include not considering certain terms in further analysis.

The filtered set of terms may be used to categorize the one or more web pages in a categorizing operation 110. The categorization operation 110 may form a set of categorized web pages comprising one or more web pages. Categorization may include taking the filtered set of terms and performing linear regression to fit each web page into a pre-defined category. Examples of pre-defined categories include "news," "sports," and "entertainment" for instance. More specific categories include "U.S. news," "football," and "recently-released movies." Other methods of fitting web pages into categories, such as neural networks or support vector machines may be substituted for linear regression.

Web page categorization thus improves the efficiency of web-based applications. Categorization provides better contextual advertising for web publishers, user-generated content sites, social networks, and advertisement networks. Categorization is also used by web sites to provide listings of hyperlinks to users.

In an embodiment, a categorized set of web pages may be communicated to a search engine for use in a web search. When a user enters query terms into the search engine, the search engine may search the categorized web pages for the query terms. In an alternative embodiment, a categorized set of web pages may be communicated to an advertisement recommendation system in which the categorized set of web pages may be used to recommend an advertisement to be served with a web page. For instance, a user may request a web page. The system that serves the web page may request an advertisement from an advertisement engine. An advertisement recommendation system may use the category that the web page has been classified under in order to recommend one or more advertisements for the advertisement engine to serve with the web page. Alternatively, a categorized set of web pages may be communicated directly to the advertisement engine enabling the engine to select an advertisement to serve based on the categorized set of web pages.

Figure 2:
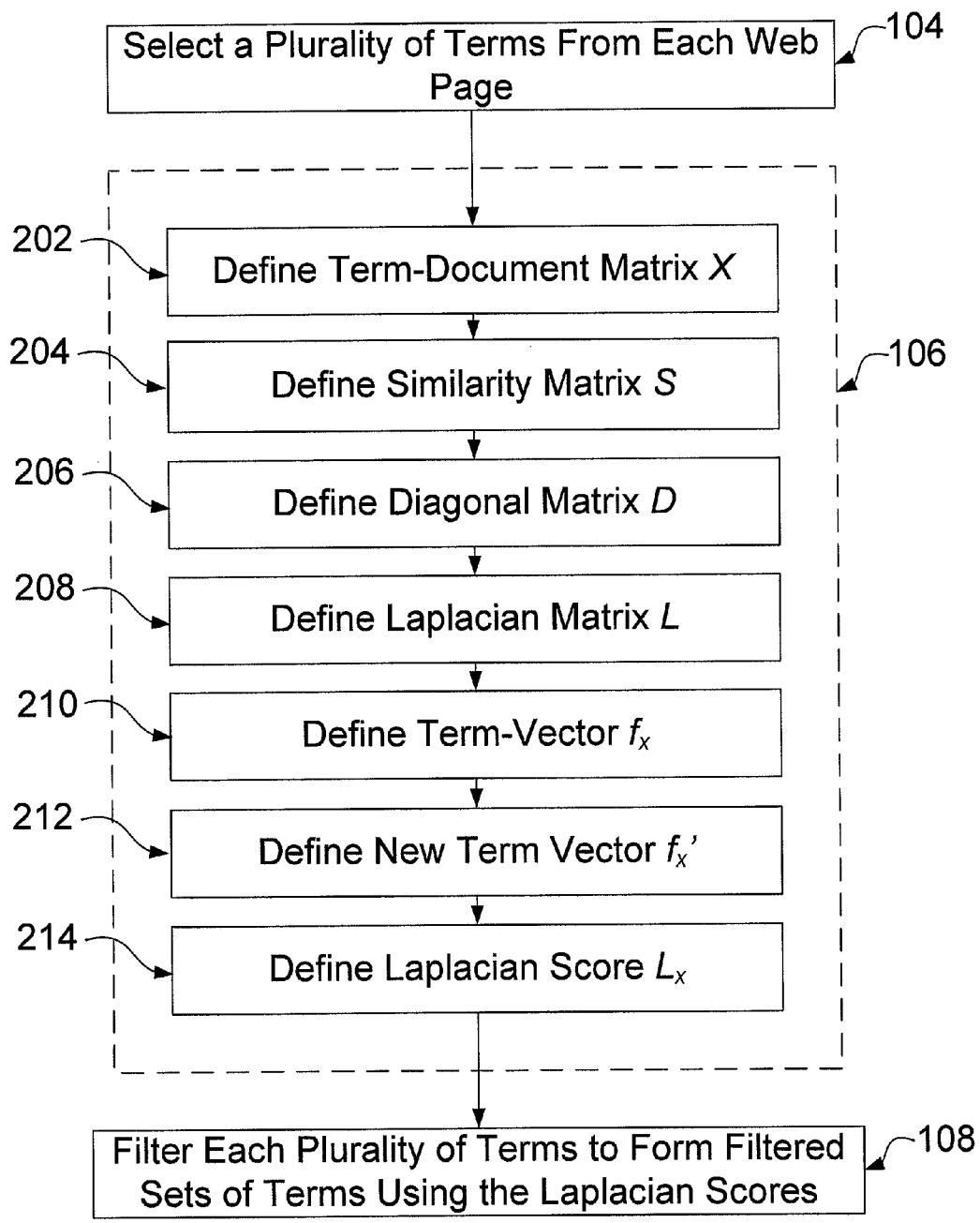
FIG. 2 illustrates an embodiment of the assigning a Laplacian score operation.

FIG. 2 illustrates an embodiment of the calculating and assigning a Laplacian score operation 106. The first step in the assigning operation 106 is to define a term-document matrix X from the given web pages and the terms selected from those web pages in the define matrix X operation 202. The term-document matrix X was previously defined as:

$$X = \begin{pmatrix} X_{11} & X_{12} & \ldots & X_{1m} \\ X_{21} & X_{22} & \ldots & X_{2m} \\ \vdots & \vdots & \ddots & \vdots \\ X_{n1} & X_{n2} & \ldots & X_{nm} \end{pmatrix} \quad (3)$$

Each element of the matrix is defined as $X_{ij}$ where i comprises the values 1 to n, and j comprises the values 1 to m. In an embodiment, n represents the number of web pages and m represents the number of terms. In another embodiment, m represents the number of terms and m represents the number of web pages. Although the matrix may be defined in either way, for simplicity the rest of this disclosure will assume that m represents the number of web pages and n represents the number of terms. The term-document matrix may include one or more web pages and one or more terms.

The matrix elements $X_{ij}$ may represent the appearance of an $i^{th}$ term in a $j^{th}$ web page. In an embodiment, the appearance may be a binary determination; elements $X_{ij}$ may be defined as a first number if the $i^{th}$ term appears in the $j^{th}$ web page, and a second number if the $i^{th}$ term does not appear in the $j^{th}$ web page. For instance, the first number could be one and the second number could be zero.

For example, there may be three imaginary web pages (referred to as A, B, and C) wherein the terms Ace, Bat, Car appear at least once in A; Ace, Car, and Door appear at least once in B; and Car, Door, and Ear appear at least once in C (see chart below).

|       | A | B | C |
|-------|---|---|---|
| Ace   | 1 | 1 | 0 |
| Bat   | 1 | 0 | 0 |
| Car   | 1 | 1 | 1 |
| Door  | 0 | 1 | 1 |
| Ear   | 0 | 0 | 1 |

Selection of these words may have been carried out by the selection operation 104. A term-document matrix X for these web pages and their terms would be as follows:

$$X = \begin{pmatrix} 1 & 1 & 0 \\ 1 & 0 & 0 \\ 1 & 1 & 1 \\ 0 & 1 & 1 \\ 0 & 0 & 1 \end{pmatrix} \quad (4)$$

The variable m is equal to three since there are three web pages, and the variable n is equal to five since there are five terms.

In an embodiment, the appearance may be a frequency-based determination; the elements of $X_{ij}$ may equal the frequency or number of times that the $i^{th}$ term appears the $j^{th}$ web page. For instance an imaginary matrix X where the matrix elements $X_{ij}$ represent the frequency of the $i^{th}$ term appearing in the $j^{th}$ document would be as follows:

$$X = \begin{pmatrix} 6 & 3 & 0 \\ 5 & 0 & 0 \\ 1 & 1 & 1 \\ 0 & 1 & 21 \\ 0 & 0 & 15 \end{pmatrix} \quad (5)$$

This term-document matrix indicates that Ace appears 6 times in document A, 3 times in document B, and 0 times in document C. The frequency of other terms appearing in web pages A, B, and C is also easily ascertained from this example matrix.

Defining the matrix terms $X_{ij}$ via binary or frequency-based means as seen above, are not the only ways to define $X_{ij}$. For example, the matrix elements $X_{ij}$ may also be defined using term frequency-inverse document frequency (TF-IDF) indexing. Such a method defines the elements $X_{ij}$ with regards to their importance in the web page. The importance of a matrix element increases proportionally to the number of times that the respective term appears in the web page, but is offset by the frequency of the term in all web pages being represented in the matrix X.

The operation 106 may also comprise a define similarity matrix S operation 204. The similarity matrix may be defined as:

$$S = \begin{pmatrix} S_{11} & S_{12} & \ldots & S_{1m} \\ S_{21} & S_{22} & \ldots & S_{2m} \\ \vdots & \vdots & \ddots & \vdots \\ S_{m1} & S_{m2} & \ldots & S_{mm} \end{pmatrix} \quad (6)$$

The elements of S may be defined as $S_{xy}$ where $S_{xy}$ is a first number if the $x^{th}$ and $y^{th}$ web pages are hyperlinked, and $S_{xy}$ is a second number if the $x^{th}$ and $y^{th}$ web pages are not hyperlinked. In an embodiment, $S_{xy}$ may be 1 if the $x^{th}$ and $y^{th}$ web pages are hyperlinked, and may be 0 if the $x^{th}$ and $y^{th}$ web pages are not hyperlinked. For example, and returning to the three-web page example, web pages A and B may be hyperlinked, but neither B and C nor A and C may be hyperlinked. The similarity matrix for this example would be as follows:

$$S = \begin{pmatrix} 0 & 1 & 0 \\ 1 & 0 & 0 \\ 0 & 0 & 0 \end{pmatrix} \quad (7)$$

The subscripts x and y may comprise the values 1 through m (the number of web pages). If there are three web pages in the term-document matrix, then the similarity matrix will be a 3 by 3 matrix.

The method 106 also may comprise a define diagonal matrix D operation 206. The diagonal matrix D may be defined as follows:

$$D = \begin{pmatrix} D_{11} & 0 & \ldots & 0 \\ 0 & D_{22} & \ldots & 0 \\ \vdots & \vdots & \ddots & \vdots \\ 0 & 0 & \ldots & D_{zz} \end{pmatrix} \quad (8)$$

The diagonal elements may be defined as $D_{zz}$, and the non-diagonal elements of D may be equal to 0. The diagonal elements $D_{zz}$ may be the sum of the $z^{th}$ row or column in the similarity matrix S. For instance, the element $D_{11}$ is equal to the sum of either the first row or first column of the similarity matrix. $D_{11}$ for the example similarity matrix (equation 7) is 1, $D_{22}$ is 1, and $D_{33}$ is 0. The diagonal matrix for the example would be as follows:

$$D = \begin{pmatrix} 1 & 0 & 0 \\ 0 & 1 & 0 \\ 0 & 0 & 0 \end{pmatrix} \quad (9)$$

The diagonal matrix and similarity matrix may have the same dimensions.

The method 106 also comprises a define Laplacian matrix L operation 208. The matrix L is defined as the difference between the D and S matrices. In other words, L is defined as follows:

$$L = D - S \quad (10)$$

The Laplacian matrix for the example would be as follows:

$$L = \begin{pmatrix} 1 & 0 & 0 \\ 0 & 1 & 0 \\ 0 & 0 & 0 \end{pmatrix} - \begin{pmatrix} 0 & 1 & 0 \\ 1 & 0 & 0 \\ 0 & 0 & 0 \end{pmatrix} = \begin{pmatrix} 1 & -1 & 0 \\ -1 & 1 & 0 \\ 0 & 0 & 0 \end{pmatrix} \quad (11)$$

The method 106 also comprises a define term-vector $f_x$ operation 210. The term-vector comprises all elements of the X matrix for a given term. The subscript x indicates which term the term-vector represents. Therefore, x will comprise the values 1 through n. For instance, in the example $f_2$ would be the term-Vector for Bat and $f_3$ would be the term-vector for Car. $f_x$ is a 1 by m vector comprising the matrix elements $X_{i1}$ through $X_{im}$. The term-vector for the term Bat would be $f_2$=(1 0 0), the term-vector for Car would be $f_3$=(1 1 1), and the term-vector for Door would be $f_4$=(0 1 1).

Once a term-vector is defined, a new term-vector $f_x'$ may be defined in a define new term-vector $f_x'$ operation 212. The new term-vector is defined as follows:

$$f_x' = f_x - \frac{f_x D \cdot 1^T}{1 \cdot D \cdot 1^T} 1 \quad (12)$$

where $f_x$ is the term-vector, D is the diagonal matrix, 1 is a horizontal vector with elements equal to 1 and dimensions equivalent to $f_x$, and $1^T$ is the transpose of the horizontal vector 1. For the purposes of this disclosure, the transpose of a horizontal vector with dimensions 1 by m or 1 by n is the same vector but written as a vertical vector with dimensions m by 1 or n by 1, respectively. Continuing the example from above, the new term-vectors for the terms Ace, Bat, and Car are calculated as follows:

$$f_1' = f_1 - \frac{f_1 D \cdot 1^T}{1 \cdot D \cdot 1^T} 1 \quad (13)$$

$$= (6\ 3\ 0) - \frac{(6\ 3\ 0) \cdot \begin{pmatrix} 1 & 0 & 0 \\ 0 & 1 & 0 \\ 0 & 0 & 0 \end{pmatrix} \cdot \begin{pmatrix} 1 \\ 1 \\ 1 \end{pmatrix}}{(1\ 1\ 1) \cdot \begin{pmatrix} 1 & 0 & 0 \\ 0 & 1 & 0 \\ 0 & 0 & 0 \end{pmatrix} \cdot \begin{pmatrix} 1 \\ 1 \\ 1 \end{pmatrix}} \cdot (1\ 1\ 1)$$

$$= \left(\frac{3}{2}\ -\frac{3}{2}\ -\frac{9}{2}\right)$$

$$f_2' = f_2 - \frac{f_2 D \cdot 1^T}{1 \cdot D \cdot 1^T} 1 \quad (14)$$

$$= (5\ 0\ 0) - \frac{(5\ 0\ 0) \cdot \begin{pmatrix} 1 & 0 & 0 \\ 0 & 1 & 0 \\ 0 & 0 & 0 \end{pmatrix} \cdot \begin{pmatrix} 1 \\ 1 \\ 1 \end{pmatrix}}{(1\ 1\ 1) \cdot \begin{pmatrix} 1 & 0 & 0 \\ 0 & 1 & 0 \\ 0 & 0 & 0 \end{pmatrix} \cdot \begin{pmatrix} 1 \\ 1 \\ 1 \end{pmatrix}} \cdot (1\ 1\ 1)$$

$$= (0\ -1\ -1)$$

$$f_3' = f_3 - \frac{f_3 D \cdot 1^T}{1 \cdot D \cdot 1^T} 1 \quad (15)$$

$$= (1\ 1\ 1) - \frac{(1\ 1\ 1) \cdot \begin{pmatrix} 1 & 0 & 0 \\ 0 & 1 & 0 \\ 0 & 0 & 0 \end{pmatrix} \cdot \begin{pmatrix} 1 \\ 1 \\ 1 \end{pmatrix}}{(1\ 1\ 1) \cdot \begin{pmatrix} 1 & 0 & 0 \\ 0 & 1 & 0 \\ 0 & 0 & 0 \end{pmatrix} \cdot \begin{pmatrix} 1 \\ 1 \\ 1 \end{pmatrix}} \cdot (1\ 1\ 1)$$

$$= (0\ 0\ 0)$$

The new term-vector $f_x'$ may be used to calculate the Laplacian score for the respective term in a define Laplacian score $L_x$ operation 214. In this operation 214, a Laplacian score is defined for every term where the subscript x refers to the term that the Laplacian score $L_x$ is being defined for. For instance, the Laplacian score for the second term would be $L_2$. The Laplacian score for the $x^{th}$ term is defined as follows:

$$L_x = \frac{f_x' L \cdot f_x'^T}{f_x' D \cdot f_x'^T} \quad (16)$$

where $f_x'$ is the new term-vector, L is the Laplacian matrix, $f_x'^T$ is the transpose of $f_x'$, and D is the diagonal matrix. Continuing the above example, the Laplacian scores for the terms Ace, Bat, and Car are calculated as:

$$L_1 = \frac{f_1' L \cdot f_1'^T}{f_1' D \cdot f_1'^T} \qquad (17)$$

$$= \frac{(1.5 \quad -1.5 \quad 4.5) \cdot \begin{pmatrix} 1 & -1 & 0 \\ -1 & 1 & 0 \\ 0 & 0 & 0 \end{pmatrix} \cdot \begin{pmatrix} 1.5 \\ -1.5 \\ 4.5 \end{pmatrix}}{(1.5 \quad -1.5 \quad 4.5) \cdot \begin{pmatrix} 1 & 0 & 0 \\ 0 & 1 & 0 \\ 0 & 0 & 0 \end{pmatrix} \cdot \begin{pmatrix} 1.5 \\ -1.5 \\ 4.5 \end{pmatrix}}$$

$$= 2$$

$$L_2 = \frac{f_2' L \cdot f_2'^T}{f_2' D \cdot f_2'^T} \qquad (18)$$

$$= \frac{(0 \quad -1 \quad -1) \cdot \begin{pmatrix} 1 & -1 & 0 \\ -1 & 1 & 0 \\ 0 & 0 & 0 \end{pmatrix} \cdot \begin{pmatrix} 0 \\ -1 \\ -1 \end{pmatrix}}{(0 \quad -1 \quad -1) \cdot \begin{pmatrix} 1 & 0 & 0 \\ 0 & 1 & 0 \\ 0 & 0 & 0 \end{pmatrix} \cdot \begin{pmatrix} 0 \\ -1 \\ -1 \end{pmatrix}}$$

$$= 1$$

$$L_3 = \frac{L_3' L \cdot f_3'^T}{f_3' D \cdot f_3'^T} \qquad (19)$$

$$= \frac{(0 \quad 0 \quad 0) \cdot \begin{pmatrix} 1 & -1 & 0 \\ -1 & 1 & 0 \\ 0 & 0 & 0 \end{pmatrix} \cdot \begin{pmatrix} 0 \\ 0 \\ 0 \end{pmatrix}}{(0 \quad 0 \quad 0) \cdot \begin{pmatrix} 1 & 0 & 0 \\ 0 & 1 & 0 \\ 0 & 0 & 0 \end{pmatrix} \cdot \begin{pmatrix} 0 \\ 0 \\ 0 \end{pmatrix}}$$

$$= 0$$

Terms may then be ordered according to their respective Laplacian scores and filtered in the filter operation 108 as described previously. For example, the Laplacian scores for the terms Ace, Bat, and Car are 2, 1, and 0 respectively. Thus, the terms Ace, Bat, and Car may be reordered as Car, Bat, and Ace. Bat and Ace can be filtered out as the least-relevant terms. Hence, the overall method 100 allows the plurality of terms to be reduced to more efficient proportions.

Figure 3:
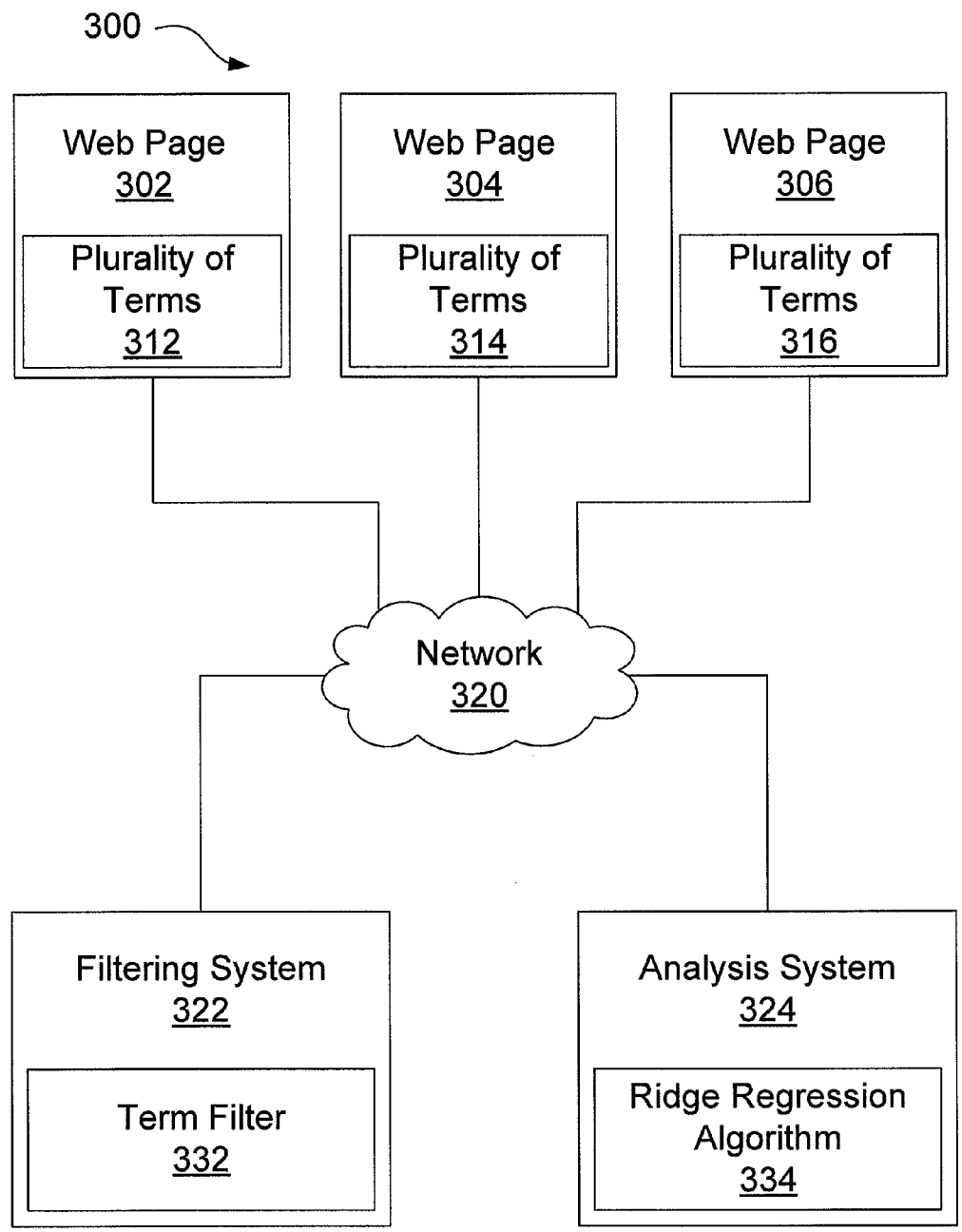
FIG. 3 illustrates a system capable of carrying out the disclosed methods.

FIG. 3 illustrates a system capable of carrying out the disclosed methods. The system 300 enables a filtering system 322 and analysis system 324 to access a plurality of web pages 302, 304, 306 via a network 320. In one embodiment, the network 320 may be an Internet. In another embodiment the network 320 may be an intranet. An intranet is a computer network allowing data transfer between computing devices on the network. Such a network may comprise personal computers, mainframes, servers, network-enabled hard drives, and any other computing device capable of connecting to other computing devices via an intranet. An intranet uses the same set of communications protocols as the Internet. Two of the most important elements in the set are the transmission control protocol (TCP) and the Internet protocol (IP). In another embodiment, the network 320 may comprise a combination of the Internet and an intranet.

The filtering system 332 may be software, hardware, or firmware (or combinations thereof) capable of reducing the number of terms used to categorize web pages. In an embodiment, the filtering system 332 may operate continuously for instance by repeating the disclosed methods without pause. In one embodiment, the filtering system 332 performs the disclosed methods in a series of overlapping loops. For instance, the system 332 may be categorizing news web pages while at the same time also categorizing social networking web pages. In another embodiment, the filtering system 332 may operate in discrete and periodic time segments. For instance, the filtering system 332 may initiate and run on the hour, once every twenty four hours, or at any other periodic time. On the other hand, the filtering system 332 may run at discrete non-periodic times. For instance, the system 332 may run more often during times when the network 320 sees high rates of usage. Alternatively, the filtering system 332 may vary the period with which it runs based on the number of new web pages that appear on the web, based on the rate with which web pages on the web are modified, or based on a combination of the two.

The filtering system 322 may comprise a term filter 332. The term filter may be hardware, software, or firmware capable of retrieving a plurality of web pages, selecting a plurality of terms from each document, filtering the plurality of terms such that a filtered set of terms is formed, and using the filtered set of terms to efficiently categorize members of the plurality of web pages. The term filter 332 may retrieve a plurality of web pages 302, 304, 306, and select a plurality of terms from each document 302, 304, 306. The plurality of terms 312, 314, 316 may be used to form a term-document matrix X Analyzing the matrix X, the term filter 332 may assign a Laplacian score to each term. Using the Laplacian scores from the plurality of terms 312, 314, 316, the term filter 332 may reduce the number of terms by filtering each plurality of terms 312, 314, 316 to form filtered sets of terms.

Since filtered sets of terms may comprise fewer terms than the plurality of terms 312, 314, 316, the analysis system 324 may be able to more quickly and accurately determine categories for each document 302, 304, 306. The analysis system 324 determines categories for the web pages 302, 304, 306 via a ridge regression algorithm 334 that uses the filtered sets of terms to fit web pages 302, 304, 306 into categories. The ridge regression algorithm 334 may be part of software that runs on the analysis system 324.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure. For example, neural networks or support vector machines could be used to fit web pages to categories instead of the ridge regression algorithm 334 illustrated in FIG. 3.

Numerous other changes may be made that will readily suggest themselves to those skilled in the art and which are encompassed in the spirit of the invention disclosed and as defined in the appended claims.

What is claimed is:

1. A method comprising:
retrieving a plurality of web pages;
selecting a plurality of terms from each web page;
assigning a Laplacian score to each term;
filtering each plurality of terms by each terms' Laplacian score to form filtered sets of terms; and
categorizing each web page of said plurality based on the filtered sets of terms to derive a categorized set of web pages,
wherein assigning a Laplacian score comprises:
defining a term-document matrix X;
wherein the elements of matrix X are defined as $X_{ij}$;
wherein i comprises the values 1 to n;
wherein j comprises the values 1 to m;
wherein n is the number of terms;
wherein m is the number of web pages; and
wherein $X_{ij}$, represents the appearance of an $i^{th}$ term in a $j^{th}$ web page.

2. The method of claim 1 further comprises communicating the categorized set of web pages to a search engine for use in a web search.

3. The method of claim 1 further comprises communicating the categorized set of web pages to an advertisement recommendation system in which the categorized set of web pages is used to recommend advertisements to be served with web pages.

4. The method of claim 1 further comprises using the categorized set of web pages to select keywords used by an advertisement engine to select advertisements to be served on a web page.

5. A method comprising:
retrieving a plurality of web pages;
selecting a plurality of terms from each web page;
assigning a Laplacian score to each term;
filtering each plurality of terms by each terms' Laplacian score to form filtered sets of terms; and
categorizing each web page of said plurality based on the filtered sets of terms to derive a categorized set of web pages,
wherein assigning a Laplacian score comprises:
defining an m by m similarity matrix S;
wherein the elements of matrix S are defined as $S_{xy}$;
wherein x comprises the values 1 through m;
wherein y comprises the values 1 through m;
wherein $S_{xy}$ is a first number if the $x^{th}$ and $y^{th}$ web pages are hyperlinked; and
wherein $S_{xy}$ is a second number if the $x^{th}$ and $y^{th}$ web pages are not hyperlinked.

6. A method comprising:
retrieving a plurality of web pages;
selecting a plurality of terms from each web page;
assigning a Laplacian score to each term;
filtering each plurality of terms by each terms' Laplacian score to form filtered sets of terms; and
categorizing each web page of said plurality based on the filtered sets of terms to derive a categorized set of web pages,
wherein assigning a Laplacian score comprises:
defining an m by m diagonal matrix D;
wherein the diagonal matrix elements are defined as $D_{zz}$;
wherein z comprises the values 1 through m;
wherein $D_{zz}$ is the sum of elements $S_{1y}$ through $S_{my}$; and
wherein y=z.

7. A method comprising:
retrieving a plurality of web pages;
selecting a plurality of terms from each web page;
assigning a Laplacian score to each term;
filtering each plurality of terms by each terms' Laplacian score to form filtered sets of terms; and
categorizing each web page of said plurality based on the filtered sets of terms to derive a categorized set of web pages,
wherein assigning a Laplacian score comprises:
defining an m by m Laplacian matrix L as the difference between the diagonal matrix D and the similarity matrix S.

8. A method comprising:
retrieving a plurality of web pages;
selecting a plurality of terms from each web page;
assigning a Laplacian score to each term;
filtering each plurality of terms by each terms' Laplacian score to form filtered sets of terms; and
categorizing each web page of said plurality based on the filtered sets of terms to derive a categorized set of web pages,
wherein assigning a Laplacian score comprises:
defining a term vector $f_x$;
wherein $f_x$ is a 1 by m vector comprising the matrix elements $X_{i1}$ through $X_{im}$; and
wherein the subscript x comprises the values 1 through n.

9. A method comprising:
retrieving a plurality of web pages;
selecting a plurality of terms from each web page;
assigning a Laplacian score to each term;
filtering each plurality of terms by each terms' Laplacian score to form filtered sets of terms; and
categorizing each web page of said plurality based on the filtered sets of terms to derive a categorized set of web pages,
wherein assigning a Laplacian score comprises:
defining a new term vector $f_x'$ as:

$$f_x' = f_x - \frac{f_x D 1^T}{1 D 1^T} 1$$

wherein $f_x$ is the term vector;
wherein D is the diagonal matrix;
wherein 1 is a horizontal vector whose elements all have the value 1;
wherein 1 has dimensions equivalent to those of $f_x$;
wherein the superscript T indicates a transpose of the horizontal vector 1; and
wherein the subscript x comprises the values 1 through n.

10. A method comprising:
retrieving a plurality of web pages;
selecting a plurality of terms from each web page;
assigning a Laplacian score to each term;
Filtering each plurality of terms by each terms' Laplacian score to form filtered sets of terms; and categorizing each web page of said plurality based on the filtered sets of terms to derive a categorized set of web pages,
wherein assigning a Laplacian score comprises:
  defining a Laplacian score $L_x$ as:

$$L_x = \frac{f'_x L f'^T_x}{f'_x D f'^T_x}$$

wherein $f_x'$ is the new term vector;
  wherein the superscript T indicates a transpose of the new term vector $f_x'$;
  wherein D is the diagonal matrix;
  wherein L is the Laplacian matrix;
    assigning the Laplacian score $L_x$ to the term associated with $f_x$; and
    wherein the subscript x comprises the values 1 through n.

11. A method comprising:
retrieving a plurality of web pages;
selecting a plurality of terms from each web page;
assigning a Laplacian score to each term;
filtering each plurality of terms by each terms' Laplacian score to form filtered sets of terms; and
categorizing each web page of said plurality based on the filtered sets of terms to derive a categorized set of web pages,
wherein filtering comprises:
  ordering the terms based on each term's assigned Laplacian score $L_x$; and
  removing consecutively ordered terms from the plurality of terms to form a filtered set of terms.

12. A method comprising:
retrieving a plurality of web pages;
selecting a plurality of terms from each web page;
assigning a Laplacian score to each term;
filtering each plurality of terms by each terms' Laplacian score to form filtered sets of terms; and
categorizing each web page of said plurality based on the filtered sets of terms to derive a categorized set of web pages,
wherein categorizing comprises:
  applying a ridge regression algorithm to the filtered set of terms in order to fit each web page to a category.

13. A method comprising:
retrieving a plurality of web pages;
selecting a plurality of terms from each web page;
assigning a Laplacian score to each term;
filtering each plurality of terms by each terms' Laplacian score to form filtered sets of terms; and
categorizing each web page of said plurality based on the filtered sets of terms to derive a categorized set of web pages,
wherein assigning a Laplacian score comprises:
  defining a term-document matrix X;
  wherein the elements of matrix X are defined as $X_{ij}$;
  wherein i comprises the values 1 to n;
  wherein j comprises the values 1 to m;
  wherein n is the number of web pages;
  wherein m is the number of terms; and
  wherein $X_{ij}$ represents the appearance of a $j^{th}$ term in an $i^{th}$ web page.

14. A method comprising:
retrieving a plurality of web pages;
selecting a plurality of terms from each web page;
  defining a term-document matrix X;
  wherein the elements of matrix X are defined as $X_{ij}$;
  wherein i comprises the values 1 to n;
  wherein j comprises the values 1 to m;
  wherein n is the number of terms;
  wherein m is the number of web pages;
  wherein $X_{ij}$ represents the appearance of an $i^{th}$ term in a $j^{th}$ web page,
  defining an m by m similarity matrix S;
  wherein the elements of matrix S are defined as $S_{xy}$;
  wherein x comprises the values 1 through m;
  wherein y comprises the values 1 through m;
  wherein $S_{xy}$ is a first number if the $x^{th}$ and $y^{th}$ web pages are hyperlinked;
  wherein $S_{xy}$ is a second number if the $x^{th}$ and $y^{th}$ web pages are not hyperlinked;
  defining an m by m diagonal matrix D;
  wherein the diagonal matrix elements are defined as $D_{zz}$;
  wherein z comprises the values 1 through m;
  wherein $D_{zz}$ is the sum of elements $S_{1y}$ through $S_{my}$;
  wherein y=z;
    defining an m by m Laplacian matrix L as the difference between the diagonal matrix D and the similarity matrix S;
    defining a term vector $f_x$;
    wherein $f_x$ is a 1 by m vector comprising the matrix elements $X_{i1}$ through $Y_{1m}$;
    wherein the subscript x comprises the values 1 through n;
  defining a new term vector $f_x'$ as:

$$f'_x = f_x - \frac{f_x D 1^T}{1 D 1^T} 1$$

wherein $f_x$ is the term vector;
wherein D is the diagonal matrix;
wherein 1 is a horizontal vector whose elements all have the value 1;
wherein 1 has dimensions equivalent to those of $f_x$;
wherein the superscript T indicates a transpose of the horizontal vector 1;
wherein the subscript x comprises the values 1 through n;
defining a Laplacian score $L_x$ as:

$$L_x = \frac{f'_x L f'^T_x}{f'_x D f'^T_x}$$

wherein $f_x'$ is the new term vector;
  wherein the superscript T indicates a transpose of the new term vector $f_x'$;
  wherein D is the diagonal matrix;
  wherein L is the Laplacian matrix;
    assigning the Laplacian score $L_x$ to the term associated with $f_x$;
    wherein the subscript x comprises the values 1 through n;
  ordering the terms based on each term's assigned Laplacian score $L_x$;
  removing consecutively ordered terms from the plurality of terms to form a filtered set of terms; and
    fitting each web page to a category.

15. The method of claim 14 wherein fitting each web page to a category comprises:

applying a ridge regression algorithm to the filtered set of terms.

16. A system for categorizing web pages comprising:
a filtering system including a keyword filter that retrieves a plurality of web pages, selects a plurality of terms from each web page, assigns a Laplacian score to each term, filters each plurality of terms by each terms' Laplacian score to form filtered sets of terms; and
an analysis system that applies a ridge regression algorithm to the filtered set of terms, and fits each web page to a category,
wherein the filtering system further comprises:
defining a term-document matrix X;
wherein the elements of matrix X are defined as $X_{ij}$;
wherein i comprises the values 1 to n;
wherein j comprises the values 1 to m;
wherein n is the number of terms;
wherein m is the number of web pages; and
wherein $X_{ij}$ represents the appearance of an $i^{th}$ term in a $j^{th}$ web page.

17. A system for categorizing web pages comprising:
a littering system including a keyword filter that retrieves a plurality of web pages, selects a plurality of terms from each web page, assigns a Laplacian score to each term, filters each plurality of terms by each terms' Laplacian score to form filtered sets of terms; and
an analysis system that applies a ridge regression algorithm to the filtered set of terms, and fits each web page to a category,
wherein the filtering system further comprises:
defining an m by m similarity matrix S;
wherein the elements of matrix S are defined as $S_{xy}$;
wherein x comprises the values 1 through m;
wherein y comprises the values 1 through m;
wherein $S_{xy}$ is a first number if the $x^{th}$ and $y^{th}$ web pages are hyperlinked; and
wherein $S_{xy}$ is a second number if the $x^{th}$ and $y^{th}$ web pages are not hyperlinked.

18. A system for categorizing web pages comprising:
a filtering system including a keyword filter that retrieves a plurality of web pages, Selects a plurality of terms from each web page, assigns a Laplacian score to each term, filters each plurality of terms by each terms' Laplacian score to form filtered sets of terms; and
an analysis system that applies a ridge regression algorithm to the filtered set of terms, and fits each web page to a category,
wherein the filtering system further comprises:
defining an m by m diagonal matrix D;
wherein the diagonal matrix elements are defined as $D_{zz}$;
wherein z comprises the values 1 through m;
wherein $D_{zz}$ is the sum of elements $S_{1y}$ through $S_{my}$; and
wherein y=z.

19. A system for categorizing web pages comprising:
a filtering system including a keyword filter that retrieves a plurality of web pages, selects a plurality of terms from each web page, assigns a Laplacian score to each term, filters each plurality of terms by each terms' Laplacian score to form filtered sets of terms; and
an analysis system that applies a ridge regression algorithm to the filtered set of terms, and fits each web pace to a category,
wherein the filtering system further comprises:
defining an m by m Laplacian matrix L as the difference between the diagonal matrix D and the similarity matrix S.

20. A system for categorizing web pages comprising:
a filtering system including a keyword filter that retrieves a plurality of web pages, selects a plurality of terms from each web page, assigns a Laplacian score to each term, filters each plurality of terms by each terms' Laplacian score to form filtered sets of terms; and
an analysis system that applies a ridge regression algorithm to the filtered set of terms, and fits each web page to a category,
wherein the filtering system further comprises:
defining a term vector $f_x$;
wherein $f_x$ is a 1 by in vector comprising the matrix elements $X_{i1}$ through $X_{im}$; and
wherein the subscript x comprises the values 1 through n.

21. A system for categorizing web pages comprising:
a filtering system including a keyword fitter that retrieves a plurality of web pages, selects a plurality of terms from each web page, assigns a Laplacian score to each term, filters each plurality of terms by each terms' Laplacian score to form filtered sets of terms; and
an analysis system that applies a ridge regression algorithm to the filtered set of terms, and fits each web page to a category,
wherein the filtering system further comprises:
defining new term vectors $f_x'$ as:

$$f_x' = f_x - \frac{f_x D1^T}{1 D1^T} 1$$

wherein $f_x$ is the term vector;
wherein D is the diagonal matrix;
wherein 1 is a horizontal vector whose elements all have the value 1;
wherein 1 has dimensions equivalent to those of $f_x$;
wherein the superscript T indicates a transpose of the horizontal vector 1; and
wherein the subscript x comprises the values I through n.

22. A system for categorizing web pages comprising:
a filtering system including a keyword filter that retrieves a plurality of web pages, selects a plurality of terms from each web page, assigns a Laplacian score to each term, filters each plurality of terms by each terms' Laplacian score to form filtered sets of terms; and
an analysis system that applies a ridge regression algorithm to the filtered set of terms, and fits each web page to a category,
wherein the filtering system further comprises:
defining Laplacian scores $L_x$ as:

$$L_x = \frac{f_x' L f_x'^T}{f_x' D f_x'^T}$$

wherein $f_x'$ is the new term vector;
wherein the superscript T indicates a transpose of the new term vector $f_x'$;
wherein D is the diagonal matrix;
wherein L is the Laplacian matrix;
assigning the Laplacian score $L_x$ to the term associated % with $f_x$; and
wherein the subscript x comprises the values 1 through n.

23. A system for categorizing web pages comprising:
a filtering system including a keyword filter that retrieves a plurality of web pages, selects a plurality of terms from each web page, assigns a Laplacian score to each term, filters each plurality of terms by each terms' Laplacian score to form filtered sets of terms; and
an analysis system that applies a ridge regression algorithm to the filtered set of terms, and fits each web page to a category,
wherein the filtering system further comprises:
   ordering the terms based on each term's assigned Laplacian score $L_x$; and
   removing consecutively ordered terms from the plurality of terms to form a filtered set of terms.

24. A system for categorizing web pages comprising:
a filtering system including a keyword filter that retrieves a plurality of web pages, selects a plurality of terms from each web page, assigns a Laplacian score to each term, filters each plurality of terms by each terms' Laplacian score to form filtered sets of terms; and
an analysis system that applies a ridge regression algorithm to the filtered set of terms, and fits each web page to a category,
wherein the filtering system further comprises:
   defining a term-document matrix X;
   wherein the elements of matrix X are defined as $X_{ij}$;
   wherein i comprises the values 1 to n;
   wherein j comprises the values 1 to m;
   wherein n is the number of web pages;
   wherein m is the number of terms; and
   wherein $X_{ij}$ represents the appearance of an $j^{th}$ term in an $i^{th}$ web page.

25. A computer readable storage medium comprising:
computer code for retrieving a plurality of web pages;
selecting a plurality of terms from each web page;
defining a term-document matrix X;
wherein the elements of matrix X are defined as $X_{ij}$;
wherein i comprises the values I to n;
wherein j comprises the values 1 to m;
wherein n is the number of terms;
wherein m is the number of web pages;
wherein $X_{ij}$ represents the appearance of an $i^{th}$ term in a $j^{th}$ web page;
defining an in by m similarity matrix S;
wherein the elements of matrix S are defined as $S_{xy}$;
wherein x comprises the values 1 through m;
wherein y comprises the values 1 through m;
wherein $S_{xy}$ is a first number if the $x^{th}$ and $y^{th}$ web pages are hyperlinked;
wherein $S_{xy}$ is a second number if the $x^{th}$ and $y^{th}$ web pages are not hyperlinked;
defining an m by m diagonal matrix D;
wherein the diagonal matrix elements are defined as $D_{zz}$;
wherein z comprises the values 1 through m;
wherein $D_{zz}$ is the sum of elements $S_{ly}$ through $S_{my}$;
wherein y=z;
   defining an in by m Laplacian matrix L as the difference between the diagonal matrix D and the similarity matrix S;
   defining a term vector $f_x$;
   wherein $f_x$ is a 1 by m vector comprising the matrix elements $X_{il}$ through $X_{im}$;
   wherein the subscript x comprises the values 1 through n;
defining a new term vector $f_x'$ as:

$$f_x' = f_x - \frac{f_x D1^T}{1 D1^T} 1$$

wherein $f_x$ is the term vector;
wherein D is the diagonal matrix;
wherein 1 is a horizontal vector whose elements all have the value 1;
wherein 1 has dimensions equivalent to those of $f_x$;
wherein the superscript T indicates a transpose of the horizontal vector 1;
wherein the subscript x comprises the values 1 through n;
defining a Laplacian score $L_x$ as:

$$L_x = \frac{f_x' L f_x'^T}{f_x' D f_x'^T}$$

wherein $f_x'$ is the new term vector;
wherein the superscript T indicates a transpose of the new term vector $f_x'$;
wherein D is the diagonal matrix;
wherein L is the Laplacian matrix;
   assigning the Laplacian score $L_x$ to the term associated with $f_x$;
   wherein the subscript x comprises the values 1 through n;
ordering the terms based on each term's assigned Laplacian score $L_x$;
removing consecutively ordered terms from the plurality of terms to form a filtered set of terms; and
   fitting each web page to a category.

* * * * *